US011159644B2

(12) United States Patent
Neishaboori

(10) Patent No.: US 11,159,644 B2
(45) Date of Patent: Oct. 26, 2021

(54) NAMED-DATA NETWORKS FOR VEHICLE-TO-INFRASTRUCTURE COMMUNICATION

(71) Applicant: Ford Global Technologies, LLC, Dearborn, MI (US)

(72) Inventor: Azin Neishaboori, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 4 days.

(21) Appl. No.: 16/172,270

(22) Filed: Oct. 26, 2018

(65) Prior Publication Data

US 2020/0137191 A1 Apr. 30, 2020

(51) Int. Cl.
*H04L 29/08* (2006.01)
*H04W 72/12* (2009.01)
*H04W 4/44* (2018.01)

(52) U.S. Cl.
CPC ............ *H04L 67/327* (2013.01); *H04W 4/44* (2018.02); *H04W 72/1205* (2013.01); *H04L 67/2842* (2013.01)

(58) Field of Classification Search
CPC ............ H04L 67/327; H04L 67/2842; H04W 72/1205; H04W 4/44
See application file for complete search history.

(56) References Cited

U.S. PATENT DOCUMENTS

| | | | |
|---|---|---|---|
| 9,986,063 | B2 | 5/2018 | Muramoto |
| 2011/0227757 | A1 | 9/2011 | Chen et al. |
| 2012/0236746 | A1* | 9/2012 | Nagai ................ H04W 4/44 370/252 |
| 2013/0258878 | A1* | 10/2013 | Wakikawa .......... G08G 1/0112 370/252 |
| 2017/0278061 | A1* | 9/2017 | Skaaksrud .......... G06Q 10/083 |
| 2019/0141568 | A1* | 5/2019 | Balakrishnan .......... G06F 16/00 |
| 2019/0205115 | A1* | 7/2019 | Gomes .................... G06F 8/65 |
| 2019/0281490 | A1* | 9/2019 | Ravindran ........ H04W 28/0257 |
| 2020/0228948 | A1* | 7/2020 | Watfa .................... H04L 67/16 |

FOREIGN PATENT DOCUMENTS

| | | |
|---|---|---|
| CN | 107369319 A | 11/1917 |
| CN | 107508855 A | 12/1917 |
| CN | 107708090 A | 2/1918 |

OTHER PUBLICATIONS

Lucas Wang et al., *Data Naming in Vehicle-to-Vehicle Communications*, 2012, 6 pages.
Sasirom Tiennoy et al., *Using a Distributed Roadside Unit for the Data Dissemination Protocol in Vanet With the Named Data Architecture*, 2018, 12 pages.

* cited by examiner

*Primary Examiner* — Jeffrey M Rutkowski
*Assistant Examiner* — Chae S Lee
(74) *Attorney, Agent, or Firm* — Frank Lollo; Eversheds Sutherland (US) LLP

(57) ABSTRACT

Method and apparatus are disclosed for named-data networks for vehicle-to-infrastructure communication. An example roadside unit includes roadside unit for vehicle-to-infrastructure communication via a named-data network includes a transceiver configured to broadcast an RSU interest packet based on a broadcast schedule and receive a vehicle data packet of a vehicle that corresponds with the RSU interest packet. The example roadside unit also includes a controller configured to dynamically adjust the broadcast schedule based on the vehicle data packet.

20 Claims, 5 Drawing Sheets

NAMED-DATA NETWORKS FOR VEHICLE-TO-INFRASTRUCTURE COMMUNICATION

TECHNICAL FIELD

The present disclosure generally relates to vehicle communication and, more specifically, to named-data networks for vehicle-to-infrastructure communication.

BACKGROUND

Many modern vehicles are able to communicate wirelessly with a remote server. In some instances, a vehicle may include an onboard communication platform that includes a wireless network interface to communicate with a remote server via an external network, such as a cellular network (e.g., a Long Term Evolution (LTE) network). Further, in some instances, an onboard communication platform of a vehicle may be able to wirelessly communicate with other nearby devices. For instance, the onboard communication platform may be a vehicle-to-everything platform that is able to communicate directly with another nearby vehicle via vehicle-to-vehicle communication and/or with a nearby roadside unit via vehicle-to-infrastructure communication.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for named-data networks for vehicle-to-infrastructure communication. An example disclosed vehicle-to-infrastructure (V2I) system utilizing a named-data network includes a vehicle configured for V2I communication and a roadside unit configured for the V2I communication. To communicate, the roadside unit is configured to broadcast an RSU interest packet based on a broadcast schedule, receive a vehicle data packet of the vehicle that corresponds with the RSU interest packet, and dynamically adjust the broadcast schedule based on the vehicle data packet.

In some examples, the vehicle is configured to broadcast the vehicle data packet responsive to receiving the RSU interest packet and identifying data stored in memory of the vehicle that corresponds with the RSU interest packet.

In some examples, the roadside unit is configured to receive a vehicle interest packet of the vehicle. In some such examples, the vehicle interest packet broadcasted by the vehicle corresponds with a subject-of-interest of the vehicle. In some such examples, the roadside unit is configured to dynamically adjust the broadcast schedule further based on the vehicle interest packet.

An example disclosed method for vehicle-to-infrastructure communication via a named-data network includes broadcasting, via a transceiver of a roadside unit, an RSU interest packet based on a broadcast schedule and receiving, via the transceiver, a vehicle data packet of a vehicle that corresponds with the RSU interest packet. The example disclosed method also includes dynamically adjusting, via a processor of the roadside unit, the broadcast schedule based on the vehicle data packet.

In some examples, dynamically adjusting the broadcast schedule based on the vehicle data packet includes adjusting how often the RSU interest packet is broadcasted upon identifying a change in demand for information corresponding with the RSU interest packet.

Some examples further include a manifest in the RSU interest packet. The manifest identifies topics of information that the roadside unit is storing to facilitate the vehicle in identifying a vehicle interest packet to broadcast.

An example disclosed roadside unit for vehicle-to-infrastructure communication via a named-data network includes a transceiver configured to broadcast an RSU interest packet based on a broadcast schedule and receive a vehicle data packet of a vehicle that corresponds with the RSU interest packet. The example disclosed roadside unit also includes a controller configured to dynamically adjust the broadcast schedule based on the vehicle data packet.

In some examples, the transceiver is configured to receive a vehicle interest packet of the vehicle. In some such examples, upon the transceiver receiving the vehicle interest packet, the controller is to identify data is stored in memory of the roadside unit that corresponds with the vehicle interest packet and the transceiver is to broadcast a corresponding RSU data packet responsive to the controller identifying the data. In some such examples, the controller is configured to dynamically adjust the broadcast schedule further based on the vehicle interest packet. In some such examples, the controller is configured to process the RSU interest packet and the vehicle interest packet in parallel.

In some examples, the roadside unit is coupled to infrastructure. In some examples, based on the broadcast schedule, the transceiver is to broadcast interest packets at a predefined interval. In some examples, the controller is configured to cache the vehicle data packet responsive to receiving the vehicle data packet. In some examples, the RSU interest packet and the vehicle data packet relate to at least one of vehicle software updates and map updates.

In some examples, the controller includes a wait state during which the controller waits to receive at least one of the vehicle data packet and a vehicle interest packet, a send-interest state during which the controller broadcasts the RSU interest packet via the transceiver, a search-for-data state during which the controller searches for data stored in memory that corresponds with the vehicle interest packet, and a send-data state during which the controller broadcasts an RSU data packet via the transceiver.

In some examples, to adjust the broadcast schedule, the controller is configured to adjust how often the RSU interest packet is to be broadcasted responsive to identifying a change in demand for information corresponding with the RSU interest packet.

In some examples, the controller includes a manifest in the RSU interest packet. The manifest identifies topics of information stored in memory of the roadside unit to facilitate the vehicle in identifying a vehicle interest packet to broadcast.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1A:
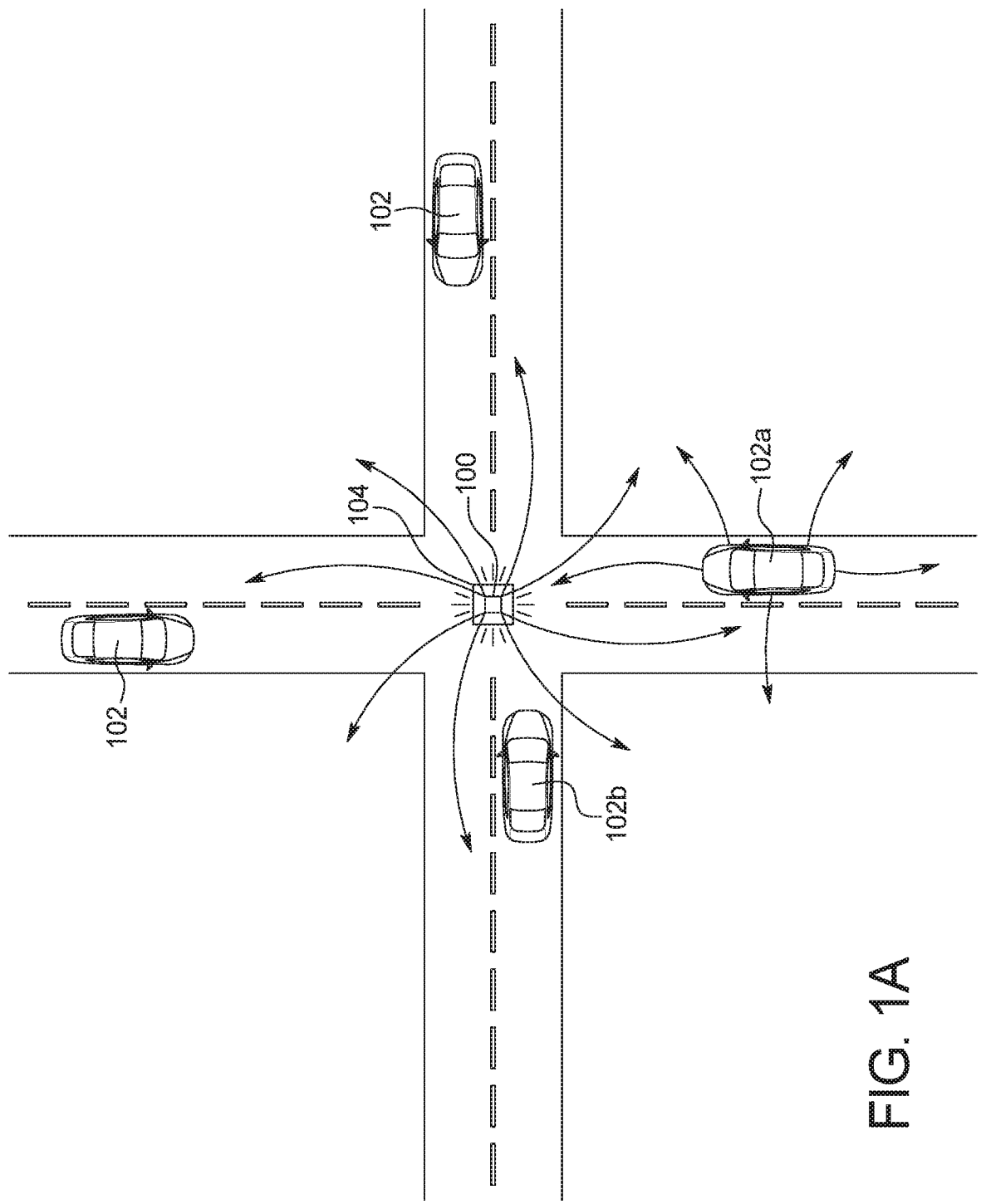
FIGS. 1A-1B illustrate an example roadside unit and example vehicles utilizing a named-data network for vehicle-to-infrastructure communication in accordance with the teachings herein.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Many modern vehicles are able to communicate wirelessly with a remote server. In some instances, a vehicle may include an onboard communication platform that includes a wireless network interface to communicate with a remote server via an external network, such as a cellular network (e.g., a Long Term Evolution (LTE) network). Further, in some instances, an onboard communication platform of a vehicle may be able to wirelessly communicate with other nearby devices. The onboard communication platform may be a vehicle-to-everything (V2X) platform that is able to communicate directly with other nearby communication devices via V2X communication.

For instance, a V2X platform may communicate directly with another nearby vehicle via vehicle-to-vehicle (V2V) communication and/or with a nearby roadside unit via vehicle-to-infrastructure (V2I) communication. In some V2X environments, a communication device, such as a vehicle or a roadside unit, constantly broadcasts data for other nearby communication devices. As a result, the communication of multiple communication devices within a relatively small area potentially may result in a relatively high level of wireless medium congestion and/or interference.

Example methods and apparatus disclosed herein reduce an amount of wireless communication congestion and/or interference for vehicle-to-infrastructure, vehicle-to-vehicle, and/or vehicle-to-everything communication by utilizing a named-data network with interest packets and data packets. That is, examples disclosed herein provide a solution of utilizing a named-data network, which is rooted in communication technology, in order to overcome the problem of communication congestion and/or interference that specifically arises in the realm of vehicle-to-infrastructure, vehicle-to-vehicle, and vehicle-to-everything communication.

Examples disclosed herein include a system for exchanging data between vehicles and roadside units using named-data networks. A roadside unit is configured to broadcast an interest packet with a data name that identifies a subject-of-interest for the interest packet to facilitate the efficient collection of data by the roadside unit. For example, the roadside unit is configured to broadcast different interest packets for different data names at different dynamically-adjusted periods of time. A vehicle is configured to receive the interest packet broadcasted by the roadside unit when the vehicle is within a communication range of the roadside unit. For example, if a vehicle (1) receives an interest packet from the roadside unit and (2) has data corresponding with the data name of the interest packet, the vehicle sends a data packet to the roadside unit with the corresponding data. The roadside unit also is configured to cache the data collected from the vehicle for future retrieval upon demand by other devices such as vehicles.

Further, in examples disclosed herein, a vehicle also is configured to broadcast an interest packet. In some examples, the roadside unit includes a manifest in an interest packet sent by the roadside unit to facilitate the vehicle in identifying an interest packet for broadcasting. The manifest identifies topics of information that are currently stored in memory of the roadside unit. The roadside unit is configured to receive the interest packet of the vehicle when the vehicle is within the communication range of the roadside unit. For example, if the roadside unit (1) receives an interest packet from a vehicle and (2) has data corresponding with a data name of the interest packet, the roadside unit sends a data packet with the data to the other vehicle.

As used herein, a "named-data network" refers to a communication network architecture that utilizes interest packets and data packets to distribute content based on a name associated with the content. As used herein, an "interest packet" refers to a packet of information that includes a name identifying a desired subject-of-interest of data. A node (e.g., a roadside unit, a vehicle, etc.) broadcasts an interest packet to request the desired subject-of-interest of data from one or more other nodes (e.g., a vehicle, a roadside unit, etc.). As used herein, a "data packet" refers to a packet of information that includes a desired subject-of-interest of data corresponding with an interest packet. A node (e.g., a vehicle, a roadside unit, etc.) broadcasts a data packet upon (1) receiving an interest packet and (2) determining that the node has a desired subject-of-interest of data identified by the interest packet.

Figure 1B:
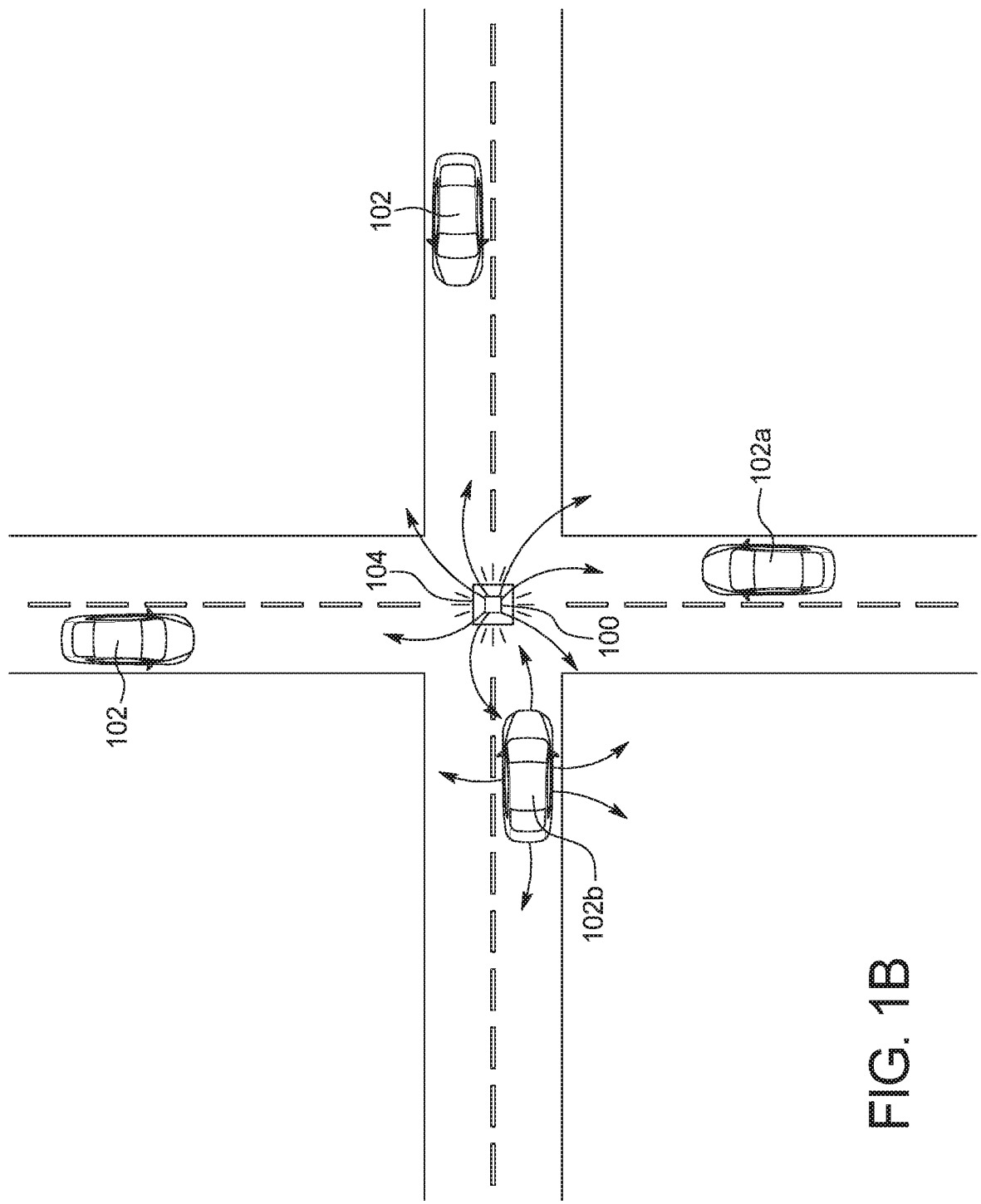

Turning to the figures, FIGS. 1A-1B illustrate an example roadside unit 100 and example vehicles 102 of a vehicle-to-infrastructure (V2I) system that utilizes a named-data network for V2I communication in accordance with the teachings herein.

The roadside unit 100 is coupled to infrastructure 104. In the illustrated example, the infrastructure 104 is a stoplight. In other examples, the infrastructure 104 may be a streetlight, a road sign, a post, a bridge, and/or any other type of infrastructure. Further, the roadside unit 100 is configured for V2I communication via named-data networks. For example, the roadside unit 100 includes hardware (e.g., electronic components 200 of FIG. 2) and software to broadcast messages and/or establish communicative connections with one or more of the vehicles 102 and/or other devices (e.g., roadside units, mobile devices, etc.). For example, the roadside unit 100 includes hardware and software to perform V2I communication with one or more of the vehicles 102.

In the illustrated example, the roadside unit 100 includes wired or wireless network interfaces to enable communication with other devices and/or external networks. In some examples, the roadside unit 100 utilizes a wireless personal area network (WPAN) module to wirelessly communicate with the roadside unit 100 via short-range wireless communication protocol(s). For example, the roadside unit 100 may implement the Bluetooth® and/or Bluetooth® Low Energy (BLE) protocols. Additionally or alternatively, the roadside unit 100 may be configured to wirelessly communicate via Wi-Fi®, Near Field Communication (NFC), ultra-wide band (UWB) communication, ultra-high frequency (UHF) communication, low frequency (LF) communication, and/or any other communication protocol that enables the roadside unit 100 to communicate via V2I communication. Further, the external network(s) may be a public network, such as the Internet; a private network, such as an intranet; or combinations thereof, and may utilize a variety of networking protocols now available or later developed including, but not limited to, TCP/IP-based networking protocols. For example, the roadside unit 100 includes one or more communication controllers for cellular networks, such as Global System for Mobile Communications (GSM), Universal Mobile Telecommunications System (UMTS), Long Term Evolution (LTE), Code Division Multiple Access (CDMA).

In some examples, the roadside unit 100 includes a cellular vehicle-to-everything (C-V2X) module. C-V2X modules include hardware and software to communicate between (e.g., the vehicles 102), infrastructure-based modules (e.g., the roadside unit 100), other nearby communication devices (e.g., mobile device-based modules), and cellular towers. For example, a C-V2X module is configured to communicate with nearby devices (e.g., vehicles, roadside units, etc.) directly and/or via cellular networks. Currently, standards related to C-V2X communication is being developed by the 3rd Generation Partnership Project. Further, in some examples, the roadside unit 100 includes a dedicated short-range communication (DSRC) module. DSRC modules include hardware and software to communicate between vehicles (e.g., the vehicles 102), infrastructure-based modules (e.g., the roadside unit 100), and/or other nearby communication devices (e.g., mobile device-based modules). More information on the DSRC network and how the network may communicate with vehicle hardware and software is available in the U.S. Department of Transportation's Core Jun. 2011 System Requirements Specification (SyRS) report (available at http://www.its.dot.gov/meetings/pdf/CoreSystem_SE_SyRS_RevA %20(2011-06-13).pdf), which is hereby incorporated by reference in its entirety along with all of the documents referenced on pages 11 to 14 of the SyRS report.

Each of the vehicles 102 of the illustrated example may be a standard gasoline powered vehicle, a hybrid vehicle, an electric vehicle, a fuel cell vehicle, and/or any other mobility implement type of vehicle. The vehicles 102 include parts related to mobility, such as a powertrain with an engine, a transmission, a suspension, a driveshaft, and/or wheels, etc. Each of the vehicles 102 may be non-autonomoufor future retrieval upon demand by other devices such as vehicles, semi-autonomous (e.g., some routine motive functions controlled by the vehicle 102), or autonomous (e.g., motive functions are controlled by the vehicle 102 without direct driver input). Further, each of the vehicles 102 of the illustrated example includes a communication module (e.g., an onboard communication module 304 of FIG. 3) that is configured for V2I, V2V, V2P (vehicle-to-person via a mobile device of the person) and/or V2X communication. That is, the vehicles 102 of the illustrated example are configured for V2I, V2V, V2P, and/or V2X communication During operation as illustrated in FIG. 1A, the roadside unit 100 broadcasts a roadside unit (RSU) interest packet based on a broadcast schedule of the roadside unit 100. The RSU interest packet identifies a subject-of-interest for which the roadside unit 100 is seeking additional data. Example subjects-of-interest relate to traffic data, map data, vehicle software updates, etc. The RSU interest packet includes a name to enable the vehicles 102 and/or other electronic communication devices to identify the subject-of-interest for the RSU interest packet. Example names for interest packets include "/application/geolocation/timestamp/datatype/nonce/," "/map/geolocation/," "/traffic/geolocation/," and "/application/."

The roadside unit 100 broadcasts RSU interest packets based on a broadcast schedule to facilitate the roadside unit 100 in efficiently collecting data-of-interest without creating wireless communication congestion and/or interference. For example, the roadside unit 100 broadcasts RSU interest packets at a predefined interval (e.g., one interest packet per second) based on the broadcast schedule to reduce an amount of V2X communication being broadcasted in a surrounding area of the roadside unit 100. The broadcast schedule identifies a sequence in which RSU interest packets for one or more subjects-of-interest is to be broadcasted.

When a vehicle (e.g., one of the vehicles 102) is within a communication range of the roadside unit 100, the vehicle receives the RSU interest packet broadcasted from the roadside unit 100. Upon receiving the RSU interest packet, the vehicle determines whether the vehicle has data that corresponds with the RSU interest packet. For example, the vehicle determines whether the vehicle has data that corresponds with the RSU interest packet based on the name of the RSU interest packet (e.g., the vehicle determines whether the vehicle has traffic data if the name of the RSU interest packet identifies "traffic" as a subject-of-interest). Further, the vehicle broadcasts a vehicle data packet that includes the data for the subject-of-interest of the RSU interest packet in response to the vehicle (1) receiving the RSU interest packet, (2) identifying the subject-of-interest of the RSU interest packet based on the corresponding name, and (3) identifying data stored in memory of the vehicle (e.g., memory 314 of FIG. 3) that corresponds with the subject-of-interest of the RSU interest packet. In some examples, the data packet is geographically scoped (e.g. specific to a map tile and/or a zone based on latitude and longitude). Further, in some examples, the data packet includes a software update, a map update, a weather update, a road condition, etc.

In the illustrated example of FIG. 1A, a vehicle 102a of the vehicles 102 has data that corresponds with the subject-of-interest of the RSU interest packet broadcasted by the roadside unit 100. When the vehicle 102a is within the communication range of the roadside unit 100, the vehicle 102 receives the RSU interest packet. Subsequently, the vehicle 102a identifies the subject-of-interest of the RSU interest packet and determines that it has data corresponding with the subject-of-interest. In turn, the vehicle 102a prepares a vehicle data packet to include the corresponding data and broadcasts the vehicle data packet for the roadside unit 100. Further, in the illustrated example, the other of the vehicles 102 do not have data that corresponds with the subject-of-interest of the RSU interest packet broadcasted by the roadside unit 100. When the other of the vehicles 102 are within the communication range of the roadside unit 100, the other of the vehicles 102 receive the RSU interest packet. Subsequently, each of the other of the vehicles 102 identify the subject-of-interest of the RSU interest packet and determine that it does not have data corresponding with the subject-of-interest. In turn, each of the other of the vehicles 102 does not broadcast a corresponding vehicle data packet.

When a vehicle (e.g., the vehicle 102a) broadcasts a vehicle data packet within the communication range of the roadside unit 100, the roadside unit 100 receives the vehicle data packet broadcasted by the vehicle. That is, the roadside unit 100 receives the vehicle data packet of the vehicle that corresponds with the RSU interest packet previously broadcasted by the roadside unit 100. Upon receiving a vehicle data packet, the roadside unit 100 caches the vehicle data packet to increase processing speed of the roadside unit 100 when accessing the data. For example, the roadside unit 100 retrieves the cached data when another vehicle requests such data from the roadside unit 100. In some examples, the roadside unit 100 is configured to process RSU interest packet(s) and vehicle interest packet(s) in parallel.

In the illustrated example, the roadside unit 100 dynamically adjusts the broadcast schedule in real-time based on the received vehicle data packets. For example, if the roadside unit 100 receives an amount of data that enables the roadside unit 100 to identify traffic conditions of the surrounding area, the roadside unit 100 dynamically adjusts the broadcast schedule to reduce a frequency at which an RSU interest packet for traffic is broadcasted. In contrast, if the roadside unit 100 has not received data related traffic conditions of the surrounding area for an extended period of time, the roadside unit 100 dynamically adjusts the broadcast schedule to increase the frequency at which an RSU interest packet for traffic is broadcasted. Further, in some examples, the roadside unit 100 dynamically adjusts the broadcast schedule to increase the frequency at which an RSU interest packet for traffic is broadcasted if the rate at which the roadside unit 100 receives request for traffic information (e.g., in the form of a vehicle interest packet) increases. That is, the roadside unit 100 adjusts how often a RSU interest packet for a particular subject-of-interest is to be broadcasted responsive to identifying a change in demand for information corresponding with the RSU interest packet. Further, in some examples, the roadside unit 100 adjusts the predefined interval at which the roadside unit 100 broadcasts RSU interest packets based on a rate at which the roadside unit 100 receives data (e.g., in the form of a data packet) and/or request(s) for data (e.g., in the form of an interest packet) from the vehicles 102.

Additionally or alternatively, the roadside unit 100 includes a manifest in broadcasted RSU interest packet(s). The manifest includes subjects-of-information that the roadside unit 100 is storing (e.g., as cached data) to facilitate a vehicle (e.g., one or more of the vehicles 102) in determining whether the roadside unit 100 has data that is of interest to the vehicle. That is, the manifest facilitates a vehicle in identifying a vehicle interest packet to broadcast for the roadside unit 100.

Also during operation, vehicle(s) broadcast vehicle interest packet(s). In FIG. 1B, a vehicle 102b broadcasts a vehicle interest packet that identifies a subject-of-interest for which the vehicle 102b is seeking additional data. The vehicle interest packet includes a name to enable the roadside unit 100 and/or other electronic communication devices to identify the subject-of-interest for the vehicle interest packet.

When the vehicle 102b is within the communication range of the roadside unit 100, the roadside unit 100 receives the vehicle interest packet broadcasted by the vehicle 102b. Upon receiving the vehicle interest packet, the roadside unit 100 determines whether the roadside unit 100 has data that corresponds with the vehicle interest packet. For example, the roadside unit 100 determines whether the roadside unit 100 has data that corresponds with the vehicle interest packet based on the name of the vehicle interest packet. Further, the roadside unit 100 broadcasts an RSU data packet that includes the data for the subject-of-interest of the vehicle interest packet in response to the roadside unit 100 (1) receiving the vehicle interest packet, (2) identifying the subject-of-interest of the vehicle interest packet based on the corresponding name, and (3) identifying data stored in memory of the roadside unit 100 (e.g., cached data 210 stored in memory 204 of FIG. 2) that corresponds with the subject-of-interest of the vehicle interest packet. For example, the roadside unit 100 includes (1) a wait state during which the roadside unit 100 waits to receive a vehicle data packet and/or a vehicle interest packet, (2) a send-interest state during which the roadside unit 100 broadcasts an RSU interest packet, (3) a search-for-data state during which the roadside unit 100 searches for data (e.g., the cached data 210) stored in memory (e.g., the memory 204) that corresponds with a received vehicle interest packet, and (4) a send-data state during which the roadside unit 100 broadcasts an RSU data packet.

When the roadside unit 100 broadcasts an RSU data packet, the vehicle 102b receives the RSU data packet when the vehicle 102b is within the communication range of the roadside unit 100. That is, the vehicle 102 receives the RSU data packet of the roadside unit 100 that corresponds with the vehicle interest packet previously broadcasted by the vehicle 102b. Upon receiving a RSU data packet, the vehicle 102b stores the RSU data packet in memory (e.g., the memory 314) onboard the vehicle 102b.

In the illustrated example, the roadside unit 100 dynamically adjusts the broadcast schedule in real-time based on the subjects-of-interest of received vehicle interest packets. For example, the roadside unit 100 adjusts how often a RSU interest packet for a particular subject-of-interest is to be broadcasted responsive to identifying a change in how often the roadside unit 100 receives vehicle interest packet(s) for the subject-of-interest. Further, in some examples, the roadside unit 100 adjusts the predefined interval at which the roadside unit 100 broadcasts RSU interest packets based on a rate at which the roadside unit 100 receives vehicle interest packet(s).

Figure 2:
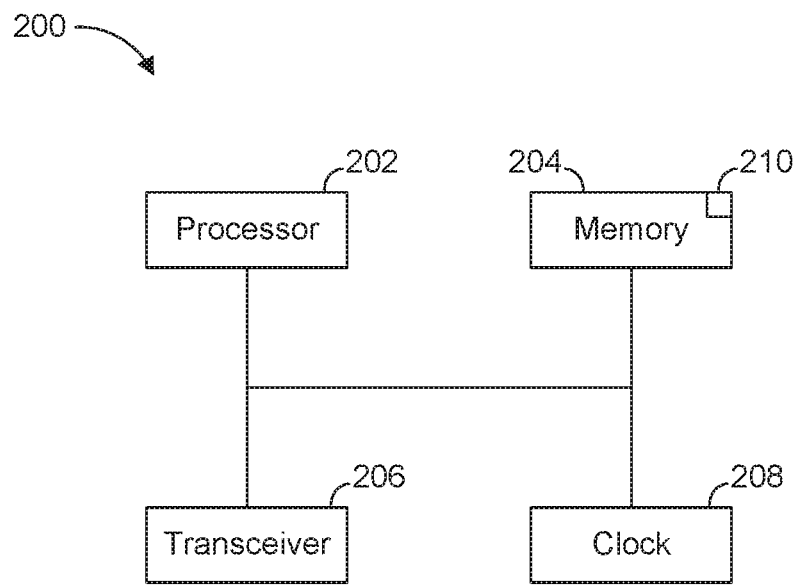
FIG. 2 is a block diagram of electronic components of the roadside unit of FIGS. 1A-1B.

FIG. 2 is a block diagram of electronic components 200 of the roadside unit 100. In the illustrated example, the electronic components 200 include a processor 202, memory 204, a transceiver 206, and a clock 208.

The processor 202 (also referred to as a microcontroller unit and a controller) of the illustrated example includes any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 204 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 204 includes multiple kinds of memory, particularly volatile memory and non-volatile memory.

In the illustrated example, the memory 204 includes cached data 210. For example, the cached data 210 includes data that was included in received vehicle interest packet(s). The vehicle interest packet(s) is cached and stored as cached data 210 in the memory 204 to increase processing speed when accessing the stored data. For example, the processor 202 retrieves the cached data 210 when a vehicle requests such data from the roadside unit 100 via a vehicle interest packet.

Further, the memory 204 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 204, the computer readable medium, and/or within the processor 202 during execution of the instructions.

The transceiver 206 is configured to broadcast and/or receive data for the roadside unit 100. For example, the transceiver 206 is configured to broadcast roadside unit (RSU) interest packet(s) and/or roadside unit (RSU) data packet(s) via V2I communication to one or more of the vehicles 102. Further, the transceiver 206 is configured to receive vehicle interest packet(s) and/or vehicle data packet(s) via V2I communication from one or more of the vehicles 102.

Further, the clock 208 of the illustrated example is configured to measure a time. For example, the processor 202 utilizes the time, as determined by the clock 208, to determine when to broadcast, via the transceiver 206, an RSU interest pack.

In operation, the transceiver 206 broadcasts an RSU interest packet based on a broadcast schedule. The RSU interest packet identifies a subject-of-interest for which the roadside unit 100 is seeking additional data. The RSU interest packet includes a name to enable the vehicles 102 and/or other electronic communication devices to identify the subject-of-interest for the RSU interest packet. The transceiver 206 broadcasts RSU interest packets based on a broadcast schedule to facilitate the roadside unit 100 in efficiently collecting data-of-interest without creating excessive wireless communication congestion and/or interference. For example, the transceiver 206 broadcasts RSU interest packets at a predefined interval based on the broadcast schedule to reduce an amount of V2X communication being broadcasted in a surrounding area of the roadside unit 100.

When a vehicle (e.g., the vehicle 102a) is within the communication range of the transceiver 206 and broadcasts a vehicle data packet, the transceiver 206 receives the vehicle data packet broadcasted by the vehicle. That is, the roadside unit 100 receives the vehicle data packet of the vehicle that corresponds with the RSU interest packet previously broadcasted by the transceiver 206. Upon receiving a vehicle data packet, the processor 202 caches the vehicle data packet and stores the cached data 210 in the memory 204 to increase processing speed. For example, the processor 202 retrieves the cached data 210 when the transceiver 206 receives a request for such data (e.g., via a vehicle interest packet) from a vehicle. In some examples, the processor 202 is configured to process RSU interest packet(s) and vehicle interest packet(s) in parallel.

Additionally or alternatively, the transceiver 206 receives a vehicle interest packet broadcasted by a vehicle (e.g., the vehicle 102b) when the vehicle is within the communication range of the transceiver 206. Upon the transceiver 206 receiving the vehicle interest packet, the processor 202 determines whether the memory 204 has data that corresponds with the vehicle interest packet. For example, the processor 202 identifies, based on the name of the vehicle interest packet, whether there is data stored in the memory 204 that corresponds with the vehicle interest packet. Further, the transceiver 206 broadcasts a corresponding RSU data packet that includes the data for the subject-of-interest of the vehicle interest packet in response to (1) the transceiver 206 receiving the vehicle interest packet, (2) the processor 202 identifying the subject-of-interest of the vehicle interest packet based on the corresponding name, and (3) the processor 202 identifying data stored in the memory 204 that corresponds with the subject-of-interest of the vehicle interest packet. For example, the processor 202 includes (1) a wait state during which the processor 202 waits to receive a vehicle data packet and/or a vehicle interest packet, (2) a send-interest state during which the processor 202 broadcasts an RSU interest packet, (3) a search-for-data state during which the processor 202 searches for the cached data 210 stored in the memory 204 that corresponds with a received vehicle interest packet, and (4) a send-data state during which the processor 202 broadcasts an RSU data packet via the transceiver 206.

Further, the processor 202 of the illustrated example dynamically adjusts the broadcast schedule of the roadside unit 100 based on received vehicle interest packets and/or data of received vehicle data packets. In some examples, the processor 202 adjusts how often the transceiver 206 broadcasts a RSU interest packet for a particular subject-of-interest responsive to the processor 202 identifying a change in how often the transceiver 206 receives vehicle interest packet(s) for the subject-of-interest. Further, in some examples, the processor 202 adjusts the predefined interval at which the transceiver 206 broadcasts RSU interest packets based on a rate at which the transceiver 206 receives vehicle data packet(s) and/or vehicle interest packet(s).

Additionally or alternatively, the processor 202 includes a manifest in broadcasted RSU interest packet(s). The manifest includes subjects-of-information that the memory 204 is storing (e.g., as cached data) to facilitate a vehicle (e.g., one or more of the vehicles 102) in determining whether the roadside unit 100 has data that is of interest to the vehicle.

Figure 3:
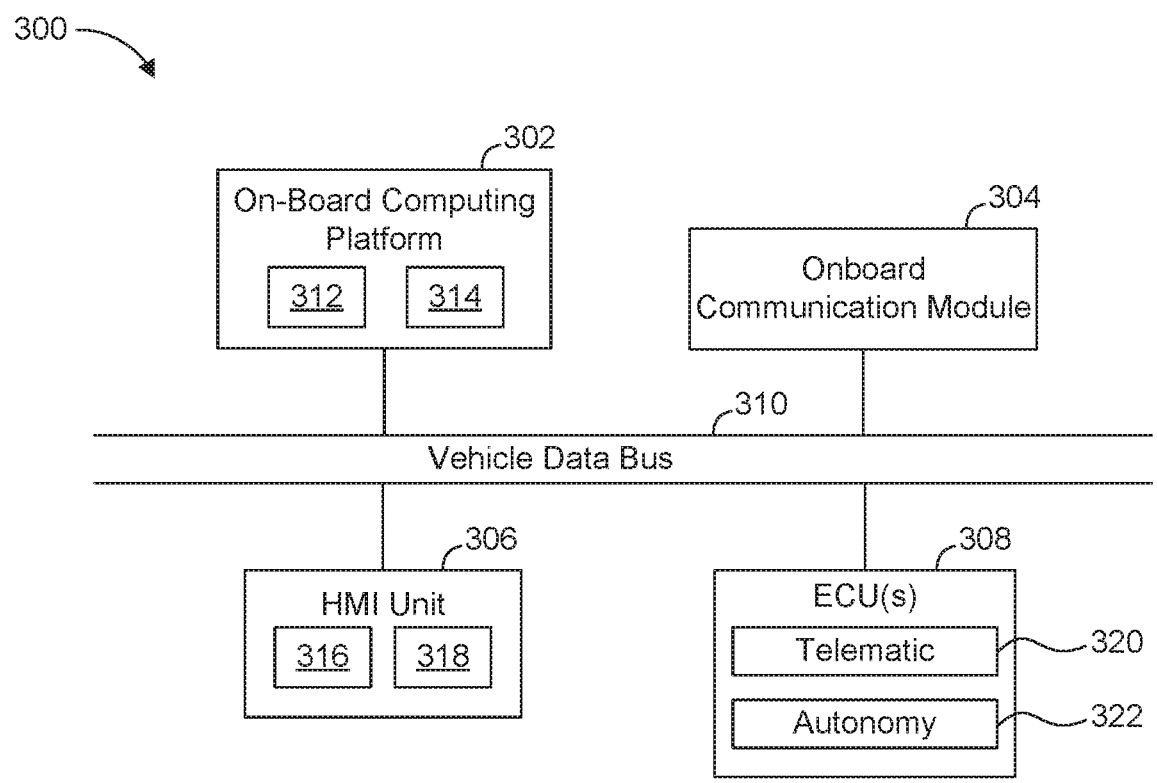
FIG. 3 is a block diagram of electronic components of one or more of the vehicles of FIGS. 1A-1B.

FIG. 3 is a block diagram of electronic components 300 of one or more of the vehicles 102. For example, each of the vehicles 102 of FIGS. 1A-1B includes the electronic components 300. In the illustrated example, the electronic components 300 include an onboard computing platform 302, an onboard communication module 304, a human-machine interface (HMI) unit 306, electronic control units (ECUs) 308, and a vehicle data bus 310.

The onboard computing platform 302 includes a processor 312 (also referred to as a microcontroller unit and a controller) and memory 314. The processor 312 is any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 314 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 314 includes multiple kinds of memory, particularly volatile memory and non-volatile memory.

The memory 314 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 314, the computer readable medium, and/or within the processor 312 during execution of the instructions.

The onboard communication module 304 of the illustrated example includes hardware (e.g., processors, memory, storage, antenna, etc.) and software to perform vehicle-to-vehicle (V2V) communication with other vehicle(s) (e.g., others of the vehicles 102), vehicle-to-infrastructure (V2I) communication with infrastructure-based module(s) (e.g., the roadside unit 100), vehicle-to-person (V2P) communication with a mobile device of a person, and/or vehicle-to-everything (V2X) (e.g., with others of the vehicles 102, the roadside unit 100, mobile device-based modules, etc.). For example, the onboard communication module 304 includes a C-V2X module, a DSRC module, and/or any other module that is configured for V2X communication. In the illustrated example, the onboard communication module 304 is configured to broadcast vehicle interest packet(s) and/or vehicle data packet(s) via V2I communication to the roadside unit 100. Further, the onboard communication module 304 is configured to receive roadside unit (RSU) packet(s) and/or roadside unit (RSU) data packet(s) via V2I communication from the roadside unit 100.

The onboard communication module 304 of the illustrated example includes wired or wireless network interfaces to enable communication with other devices and/or external networks. In some examples, the onboard communication module 304 utilizes a wireless personal area network (WPAN) module to wirelessly communicate with the roadside unit 100 via short-range wireless communication protocol(s). For example, the onboard communication module 304 implements the Bluetooth® and/or Bluetooth® Low Energy (BLE) protocols. Additionally or alternatively, the onboard communication module 304 may be configured to wirelessly communicate via Wi-Fi®, Near Field Communication (NFC), ultra-wide band (UWB) communication, ultra-high frequency (UHF) communication, low frequency (LF) communication, and/or any other communication protocol that enables the onboard communication module 304 to communicate via V2V, V2X, and/or V2I communication. Further, the external network(s) may be a public network, such as the Internet; a private network, such as an intranet; or combinations thereof, and may utilize a variety of networking protocols now available or later developed including, but not limited to, TCP/IP-based networking protocols. For example, the onboard communication module 304 includes one or more communication controllers for cellular networks, such as Global System for Mobile Communications (GSM), Universal Mobile Telecommunications System (UMTS), Long Term Evolution (LTE), Code Division Multiple Access (CDMA).

The HMI unit 306 provides an interface with a user. The HMI unit 306 includes digital and/or analog interfaces (e.g., input devices and output devices) to receive input from and display information for the user(s). The input devices include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, etc. In the illustrated example, the HMI unit 306 includes a display 316, such as a heads-up display and/or a center console display (e.g., a liquid crystal display (LCD), an organic light emitting diode (OLED) display, a flat panel display, a solid state display, etc.), and a speaker 318. In the illustrated example, the HMI unit 306 includes hardware (e.g., a processor or controller, memory, storage, etc.) and software (e.g., an operating system, etc.) for an infotainment system (such as SYNC® and MyFord Touch® by Ford®). For example, the HMI unit 306 presents the infotainment system on, for example, the display 316.

The ECUs 308 monitor and control the subsystems of the vehicle 102. For example, the ECUs 308 are discrete sets of electronics that include their own circuit(s) (e.g., integrated circuits, microprocessors, memory, storage, etc.) and firmware, sensors, actuators, and/or mounting hardware. The ECUs 308 communicate and exchange information via a vehicle data bus (e.g., the vehicle data bus 310). Additionally, the ECUs 308 may communicate properties (e.g., status of the ECUs 308, sensor readings, control state, error and diagnostic codes, etc.) to and/or receive requests from each other. For example, the vehicle 102 may have dozens of the ECUs 308 that are positioned in various locations around the vehicle 102 and are communicatively coupled by the vehicle data bus 310. In the illustrated example, the ECUs 308 include a telematics control unit 320 and an autonomy unit 322. The telematics control unit 320 controls tracking of a location of the vehicle 102, for example, utilizing a global positioning system (GPS) receiver to identify a current location of the vehicle 102. Further, the autonomy unit 322 controls performance of autonomous and/or semi-autonomous driving maneuvers of the vehicle 102 based upon, for example, data collected from the roadside unit 100.

The vehicle data bus 310 communicatively couples the onboard computing platform 302, the onboard communication module 304, the HMI unit 306, and the ECUs 308. In some examples, the vehicle data bus 310 includes one or more data buses. The vehicle data bus 310 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

In operation, the onboard communication module 304 receives an RSU interest packet broadcasted from the roadside unit 100 when the vehicle 102 is within a communication range of the roadside unit 100. Upon receiving the RSU interest packet, the processor 312 determines whether the memory 314 has data that corresponds with the RSU interest packet. For example, the processor 312 determines whether the memory 314 has data that corresponds with the RSU interest packet based on the name of the RSU interest packet. Further, the onboard communication module 304 broadcasts a vehicle data packet that includes the data for the subject-of-interest of the RSU interest packet in response to (1) the onboard communication module 304 receiving the RSU interest packet, (2) the processor 312 identifying the subject-of-interest of the RSU interest packet based on the corresponding name, and (3) the processor 312 identifying data stored in the memory 314 that corresponds with the subject-of-interest of the RSU interest packet.

Additionally or alternatively, the onboard communication module 304 broadcasts a vehicle interest packet. For example, the onboard communication module 304 broadcasts a vehicle interest packet that identifies a subject-of-interest for which the processor 312 is seeking additional data. Further, the onboard communication module 304 subsequently receives an RSU data packet from the roadside unit 100 when the vehicle 102 is within the communication range of the roadside unit 100. That is, the onboard communication module 304 receives the RSU data packet of the roadside unit 100 that corresponds with the vehicle interest packet previously broadcasted by the onboard communication module 304. Upon receiving the RSU data packet, the processor 312 stores the RSU data packet in the memory 314.

Figure 4A:
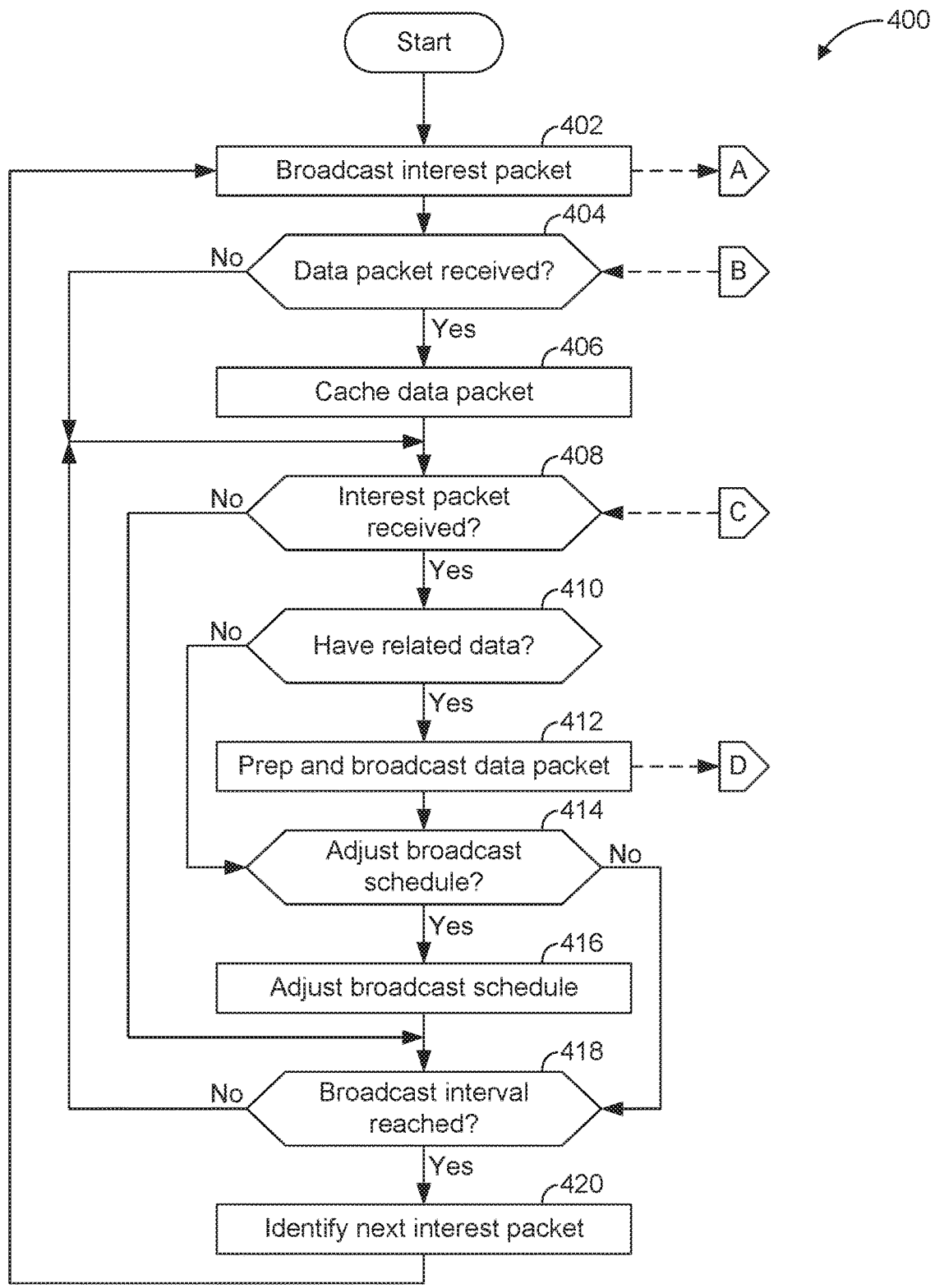
FIGS. 4A-4B are flowcharts for a roadside unit and a vehicle to utilize a named-data network for vehicle-to-infrastructure communication in accordance with the teachings herein.
Figure 4B:
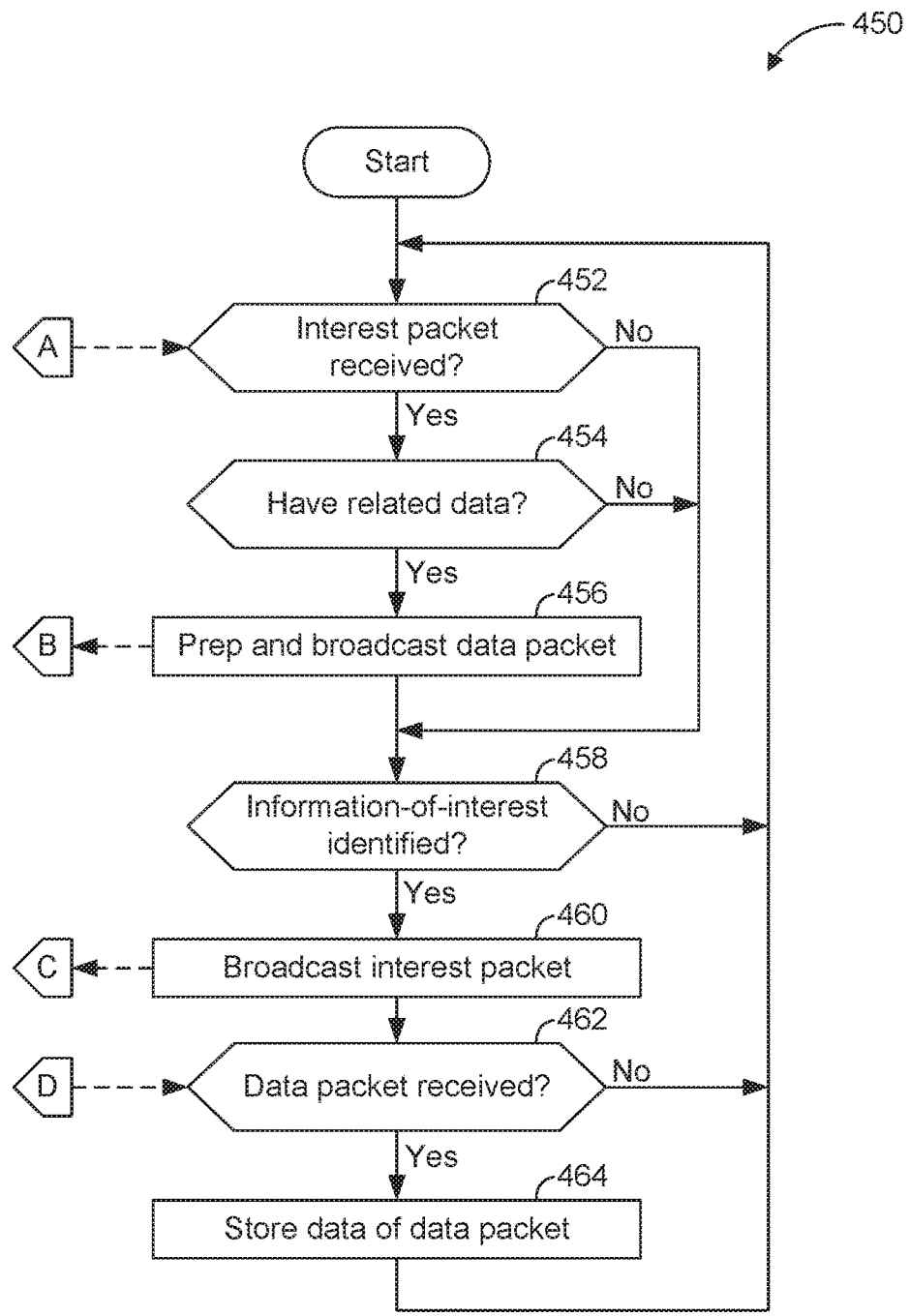

FIGS. 4A-4B are flowcharts of example methods 400, 450 to utilize a named-data network for vehicle-to-infrastructure communication. The flowcharts of FIG. 4A-4B are representative of machine readable instructions that are stored in memory (such as the memory 204 of FIG. 2 and/or the memory 314 of FIG. 3) and include one or more programs that are executed by processor(s) (such as the processor 202 of FIG. 202 and/or the processor 312 of FIG. 3). While the example program(s) are described with reference to the flowcharts illustrated in FIGS. 4A-4B, many other methods may alternatively be used. For example, the order of execution of the blocks may be rearranged, changed, eliminated, and/or combined to perform the methods 400, 450. Further, because the methods 400, 450 are disclosed in connection with the components of FIGS. 1A-3, some functions of those components will not be described in detail below.

Turning to FIG. 4A, at block 402, the transceiver 206 of the roadside unit 100 broadcasts an RSU interest packet based on a broadcast schedule. In the illustrated example, a broadcasted RSU interest packet is depicted by reference "A". At block 404, the processor 202 of the roadside unit 100 determines whether the transceiver 206 has received a corresponding vehicle data packet from one or more of the vehicles 102. In the illustrated example, a received vehicle data packet is depicted by reference "B". In response to the processor 202 determining that the roadside unit 100 has received a vehicle data packet, the method 400 proceeds to block 406 at which the processor 202 caches the vehicle data packet and stores the cached data 210 in the memory 204 onboard the roadside unit 100. Otherwise, in response to the processor 202 determining that the roadside unit 100 has not received a vehicle data packet, the method 400 proceeds to block 408.

At block 408, the processor 202 of the roadside unit 100 determines whether the transceiver 206 has received a vehicle interest packet from one or more of the vehicles 102. In the illustrated example, a received vehicle interest packet is depicted by reference "C". In response to the processor 202 determining that the roadside unit 100 has not received a vehicle interest packet, the method 400 proceeds to block 418. Otherwise, in response to the processor 202 determining that the roadside unit 100 has received a vehicle interest packet, the method 400 proceeds to block 410.

At block 410, the processor 202 of the roadside unit 100 determines whether the roadside unit 100 has data related to the received vehicle interest packet. For example, the processor 202 of the roadside unit 100 determines whether a portion of the cached data 210 corresponds with a name of the received vehicle interest packet. In response to the processor 202 determining that the roadside unit 100 does not have data related to the received vehicle interest packet, the method 400 proceeds to block 414. Otherwise, in response to the processor 202 determining that the roadside unit 100 has data related to the received vehicle interest packet, the method 400 proceeds to block 412 at which the processor 202 prepares and the transceiver 206 broadcasts an RSU data packet that includes the identified data. In the illustrated example, a broadcasted RSU data packet is depicted by reference "D".

At block 414, the processor 202 of the roadside unit 100 determines whether to adjust the broadcast schedule for broadcasting RSU interest packets. For example, the processor 202 determines whether to adjust the broadcast schedule based on received vehicle data packet(s) and/or received vehicle interest packet(s). In response to the processor 202 determining to adjust the broadcast schedule, the method 400 proceeds to block 416 at which the processor 202 of the roadside unit 100 adjusts the broadcast schedule. Otherwise, in response to the processor 202 determining not to adjust the broadcast schedule, the method 400 proceeds to block 418.

At block 418, the processor 202 of the roadside unit 100 determines whether a predefined broadcast interval of the broadcast schedule has been reached. In response to the processor 202 determining that the broadcast interval has not been reached, the method 400 returns to block 408. Otherwise, in response to the processor 202 determining that the broadcast interval has been reached, the method 400 proceeds to block 420 at which the processor 202 of the roadside unit 100 identifies which RSU interest packet is to be broadcasted next based on the broadcast signal. Upon completing block 420, the method 400 returns to block 402.

Turning to FIG. 4B, at block 452, the processor 312 of a vehicle 102 determines whether the onboard communication module 304 has received an RSU interest packet. In the illustrated example, a received RSU interest packet is depicted by reference "A". In response to the processor 312 determining that the onboard communication module 304 has not received an RSU interest packet, the method 450 proceeds to block 458. Otherwise, in response to the processor 312 determining that the onboard communication module 304 has received an RSU interest packet, the method 450 proceeds to block 454.

At block 454, the processor 312 of the vehicle 102 determines whether the vehicle 102 has data related to the received RSU interest packet. For example, the processor 312 of the vehicle 102 determines whether related data is stored in the memory 314 onboard the vehicle 102. In response to the processor 312 determining that the vehicle 102 does not have data related to the received RSU interest packet, the method 450 proceeds to block 458. Otherwise, in response to the processor 312 determining that the vehicle 102 has data related to the received RSU interest packet, the method 450 proceeds to block 456 at which the processor 312 prepares and the onboard communication module 304 broadcasts a vehicle data packet that includes the identified data. In the illustrated example, a broadcasted vehicle data packet is depicted by reference "B".

At block 458, the processor 312 of the vehicle 102 determines whether any information-of-interest has been identified. For example, the processor 312 identifies information-of-interest based on a manifest of the roadside unit 100 that is included in a received RSU interest packet. In response to the processor 312 not identifying information-of-interest, the method 450 returns to block 452. Otherwise, in response to the processor 312 identifying information-of-interest, the method 450 proceeds to block 460 at which the processor 312 of the vehicle 102 prepares and the onboard communication module 304 broadcasts a vehicle interest packet. In the illustrated example, a broadcasted vehicle interest packet is depicted by reference "C".

At block 462, the processor 312 of the vehicle 102 determines whether the onboard communication module 304 has received a corresponding RSU data packet. In the illustrated example, a received RSU data packet is represented by reference "D". In response to the processor 312 determining that the onboard communication module 304 has not received an RSU data packet, the method 450 returns to block 452. Otherwise, in response to the processor 312 determining that the onboard communication module 304 has received an RSU data packet, the method 450 proceeds to block 464 at which the processor 312 of the vehicle 102 stores the RSU interest packet in the memory 314 onboard the vehicle 102.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle-to-infrastructure (V2I) system utilizing a named-data network, the system comprising:
   a vehicle; and
   a roadside unit (RSU) configured to:
      broadcast an RSU interest packet at a frequency, the RSU interest packet including an indication of a subject-of-interest the RSU is seeking;
      receive a vehicle data packet of the vehicle that corresponds with the RSU interest packet;
      determine that data included within the vehicle data packet includes the subject-of-interest; and
      decrease, based on the determination that the data included within the vehicle data packet includes the subject-of-interest, the frequency at which the RSU interest packet is broadcasted.

2. The system of claim 1, wherein the vehicle is further configured to broadcast the vehicle data packet responsive to:
   receiving the RSU interest packet; and
   identifying data stored in memory of the vehicle that corresponds with the RSU interest packet.

3. The system of claim 1, wherein the roadside unit is further configured to receive a vehicle interest packet of the vehicle, wherein the vehicle interest packet includes a request for data from the RSU.

4. The system of claim 3, wherein the vehicle interest packet broadcasted by the vehicle corresponds with a subject-of-interest of the vehicle.

5. The system of claim 3, wherein the roadside unit is configured to increase the frequency based on receiving vehicle interest packet.

6. A method for vehicle-to-infrastructure communication via a named-data network, the method comprising:
   broadcasting, via a transceiver of a roadside unit, a roadside unit (RSU) interest packet at a frequency, the RSU interest packet including an indication of a subject-of-interest the RSU is seeking;
   receiving, via the transceiver, a vehicle data packet of a vehicle that corresponds with the RSU interest packet;
   determining that data included within the vehicle data packet includes the subject-of-interest; and
   decreasing, based on the determination that the data included within the vehicle data packet includes the subject-of-interest, the frequency at which the RSU interest packet is broadcasted.

7. The method of claim 6, further including a manifest in the RSU interest packet, the manifest identifying topics of information that the roadside unit is storing to facilitate the vehicle in identifying a vehicle interest packet to broadcast.

8. A roadside unit (RSU) for vehicle-to-infrastructure communication via a named-data network, the roadside unit comprising:
   a transceiver configured to:
      broadcast an RSU interest packet at a frequency, the RSU interest packet including an indication of a subject-of-interest the RSU is seeking; and
      receive a vehicle data packet of a vehicle that corresponds with the RSU interest packet; and
   a controller configured to:
      determine that data included within the vehicle data packet includes the subject-of-interest; and
      decrease based on the determination that the data included within the vehicle data packet includes the subject-of-interest, the frequency at which the RSU interest packet is broadcasted.

9. The roadside unit of claim 8, wherein the transceiver is further configured to receive a vehicle interest packet of the vehicle, wherein the vehicle interest packet includes a request for data from the RSU.

10. The roadside unit of claim 9, wherein, upon the transceiver receiving the vehicle interest packet:
   the controller is further configured to identify data is stored in memory of the roadside unit that corresponds with the vehicle interest packet; and
   the transceiver is further configured to broadcast a corresponding RSU data packet responsive to the controller identifying the data.

11. The roadside unit of claim 9, wherein the controller is configured to increase the frequency based on receiving vehicle interest packet.

12. The roadside unit of claim 9, wherein the controller is further configured to process the RSU interest packet and the vehicle interest packet in parallel.

13. The roadside unit of claim 8, wherein the roadside unit is coupled to infrastructure.

14. The roadside unit of claim 8, wherein, based on the frequency, the transceiver is further configured to broadcast interest packets at a predefined interval.

15. The roadside unit of claim 8, wherein the controller is further configured to cache the vehicle data packet responsive to receiving the vehicle data packet.

16. The roadside unit of claim 8, wherein the RSU interest packet and the vehicle data packet relate to at least one of vehicle software updates and map updates.

17. The roadside unit of claim 8, wherein the controller includes:
   a wait state during which the controller waits to receive at least one of the vehicle data packet and a vehicle interest packet;
   a send-interest state during which the controller broadcasts the RSU interest packet via the transceiver;
   a search-for-data state during which the controller searches for data stored in memory that corresponds with the vehicle interest packet; and a send-data state during which the controller broadcasts an RSU data packet via the transceiver.

18. The roadside unit of claim 8, wherein, to adjust the frequency, the controller is configured to adjust how often the RSU interest packet is to be broadcasted responsive to identifying a change in demand for information corresponding with the RSU interest packet.

19. The roadside unit of claim 8, wherein the controller includes a manifest in the RSU interest packet, the manifest identifies topics of information stored in memory of the roadside unit to facilitate the vehicle in identifying a vehicle interest packet to broadcast.

20. The method of claim 6, further comprising:
receiving a vehicle interest packet from the vehicle, wherein the vehicle interest packet includes a request for data including the subject-of-interest from the RSU; and
increasing, based on receiving the vehicle interest packet from the vehicle, the frequency at which the RSU interest packet is broadcasted.

* * * * *